UNITED STATES PATENT OFFICE.

LAZAR EDELEANU, OF PLOESTI, ROUMANIA.

DRYING AGENT FOR GASES.

1,041,608.　　　Specification of Letters Patent.　　Patented Oct. 15, 1912.

No Drawing.　　Application filed June 17, 1911. Serial No. 633,792.

*To all whom it may concern:*

Be it known that I, LAZAR EDELEANU, doctor of philosophy, chemist, a subject of the King of Roumania, residing at Ploesti, Kingdom of Roumania, have invented a new and useful Improvement in Drying Agents for Gases; and I do hereby declare the following to be a full, clear, and exact description of the same.

The subject-matter of this invention is a drying agent for gases.

For removing moisture from gases, *e. g.*, blast-furnace gases, hydrogen and others, hygroscopic substances have been used, as is known, by bringing them into intimate contact with the gas to be dried. To this end, metallic chlorids, such as, *e. g.*, calcium chlorid or magnesium chlorid, have been used heretofore. Every expert is well aware of the disadvantages connected with the employment of these salts; when used for a long time they deliquesce and when employed in drying apparatus cause stoppages. Now I have found that by melting together mixtures made of hygroscopic metallic chlorids, particularly calcium chlorid, with the less hygroscopic sodium chlorid very important advantages are obtained, when employing the same for drying gases, when the mixture is made in definite proportions. The relative quantities of the two substances must be so selected that for one part by weight of metallic chlorid, such as calcium chlorid, more than one part by weight of sodium chlorid is employed. The proportion of one part by weight of calcium chlorid and three parts by weight of sodium chlorid has proved the most advantageous, but the results are also obtained with a proportion of one part by weight of calcium chlorid to four parts by weight of sodium chlorid. If more calcium chlorid is used the mixture loses its advantageous action; if a lower proportion than one part by weight of sodium chlorid to one part by weight calcium chlorid is used the new mixture has no advantage when removing moisture as compared with the employment of calcium chlorid.

Anhydrous metallic chlorids can be employed for making the molten mass or metallic chlorids containing water of crystallization. In the latter case the water of crystallization escapes during the melting operation.

If the molten mass obtained by smelting about one part by weight of calcium chlorid and three parts by weight sodium chlorid is employed disintegrated for drying the gases, the pieces substantially retain their shape; they do not deliquesce and occasion no stoppage of the apparatus. In addition, this new drying agent has the advantage that it can be made ready for use again in the apparatus itself by passing hot dry air over it.

It is worthy of notice that when using one part by weight of calcium chlorid and three parts by weight of sodium chlorid a homogeneous molten mass can readily be obtained, while when using increased quantities of calcium chlorid and, particularly, when the proportion reaches approximately equal parts by weight of calcium chlorid and sodium chlorid, this is very difficult; in this case during the melting process layers are frequently formed, the one layer consisting of almost pure calcium chlorid and the other of almost pure sodium chlorid.

In the manufacture of the drying agent calcium chlorid may be partially or wholly replaced by magnesium chlorid.

I claim:—

1. As a new article of manufacture, a drying agent for gases which is composed of a solidified molten mass consisting of one part by weight of a hygroscopic metallic chlorid mixed with more than one part by weight of sodium chlorid.

2. As a new article of manufacture, a drying agent for gases which is composed of one part by weight of calcium chlorid mixed with about three parts by weight of sodium chlorid.

In testimony whereof, I have signed my name to this specification in the presence of two subscribing witnesses.

LAZAR EDELEANU.

Witnesses:
　CARL VIERECK,
　KARL WEBER.